United States Patent [19]
Suzuki et al.

[11] Patent Number: 5,257,187
[45] Date of Patent: Oct. 26, 1993

[54] TRANSLATION MACHINE SYSTEM

[75] Inventors: Hitoshi Suzuki; Shinobu Shiotani; Shinji Tokunaga, all of Nara; Tokuyuki Hirai, Yamatokoriyama; Yoji Fukumochi, Nara; Shuzo Kugimiya, Nara; Ichiko Sata, Nara, all of Japan

[73] Assignee: Sharp Kabushiki Kaisha, Osaka, Japan

[21] Appl. No.: 768,339

[22] Filed: Sep. 30, 1991

Related U.S. Application Data

[63] Continuation of Ser. No. 497,829, Mar. 22, 1990, which is a continuation of Ser. No. 125,369, Nov. 25, 1987, abandoned.

[30] Foreign Application Priority Data

Nov. 28, 1986 [JP] Japan ................................. 61-284493

[51] Int. Cl.5 ......................... G06F 15/38; G06G 7/60
[52] U.S. Cl. ................... 364/419.2; 364/920.4
[58] Field of Search ............... 364/419, 920.4, 226.4

[56] References Cited

U.S. PATENT DOCUMENTS

| | | | |
|---|---|---|---|
| 4,599,612 | 7/1986 | Kaji et al. | 364/419 X |
| 4,604,698 | 8/1986 | Ikemoto et al. | 364/419 |
| 4,774,666 | 9/1988 | Miyao et al. | 364/419 |
| 4,805,132 | 2/1989 | Okamoto et al. | 364/419 X |
| 4,831,529 | 5/1989 | Miike et al. | 364/419 |

Primary Examiner—Roy N. Envall, Jr.
Assistant Examiner—Laura Brutman
Attorney, Agent, or Firm—Birch, Stewart, Kolasch & Birch

[57] ABSTRACT

A translation machine system for translating an input sentence includes a circuit for determining the language to be input depending on the processing status of the translation machine, and a setting circuit to set the input mode corresponding to the input language determined by the circuit.

7 Claims, 3 Drawing Sheets

FIG. 4

| | «ENGLISH SENTENCE» | «TRANSLATED SENTENCE» | HIRAGANA |
|---|---|---|---|
| 1 | I am a boy. | 私は、少年である. | |
| 2 | | | |

FIG. 5

| | «ENGLISH SENTENCE» | «TRANSLATED SENTENCE» | HIRAGANA |
|---|---|---|---|
| 1 | I am a boy. | 私は、少年である. | |

SELECTION OF WORD TRANSLATION «参考 «PRESS RETURN KEY TO CANCEL»

«am»

0   a: である   b: だ   c: です

1   a: である   b: だ   c: です
2   «FREE ENTRY»

FIG. 6

ENTRY OF USER'S DICTIONARY

ENGLISH WORD
  PART OF SPEECH    1. VI  2. VT.  3. ADJ.  4. ADV.  5. NOUN
                    6. PREP/NOUN  7. PREP/VERB

TRANSLATION BASIC
  PART OF SPEECH    1. VERB  2. VT.  3. ADJ. VERB  4. ADV.
                    5. NOUN  9. CANCEL

TRANSLATION MACHINE SYSTEM

This application is a continuation of application Ser. No. 07/497,829 filed on Nov. 22, 1990, which is a continuation application of Ser. No. 07/125,369 filed on Nov. 25, 1987, now abandoned.

BACKGROUND OF THE INVENTION

The present invention relates to a translation machine system for translating an input sentence, and more particularly to a system capable of automatically setting an input mode to correspond to a desired language depending upon the processing status of the translator so as to simplify the key operations of the operator.

The translation machine system displays an input sentence and an output sentence by using a parallel language screen wherein an input sentence is displayed in a predetermined line of the screen and the output sentence is displayed on the same line but spaced apart from and following the input sentence. During the processings accompanying translation work such as the entry of data by the system into a user's dictionary, a window is opened on the display so that the processing being carried out on the input sentence may be viewed by the operator at the window.

In such a system, the language to be entered as an input sentence is determined depending on which side of the parallel language screen the cursor is located or depending upon the content of the processing being conducted at the time.

Accordingly, the present invention overcomes a problem in the art where it was necessary for the operator to change the input mode between languages each time a different input language was desired for processing. In contrast, by the present invention it is merely necessary to operate a desired function key.

SUMMARY OF THE INVENTION

It is therefore, an object of this invention to provide a translation machine system capable of automatically setting the input mode according to the cursor position or in response to the presence of a specified processing status, thereby reducing the operations that the operator should learn which are not directly related to the translation operation.

Briefly described, in accordance with the present invention, is a translation machine for translating an input sentence in a second language, comprising:

means for inputting the sentence in said first language;

means for determining a language source of said input sentence;

means for selecting one of a plurality of processing functions of said system; and means, responsive to said means for selecting, for automatically enabling said system to operate in a language input mode corresponding to the determined language source of said input sentence.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIGS. 4 to 6 are drawings showing examples of the parallel display screen for use in the translation machine system.

DESCRIPTION OF THE PREFERRED EMBODIMENT

Figure 1:
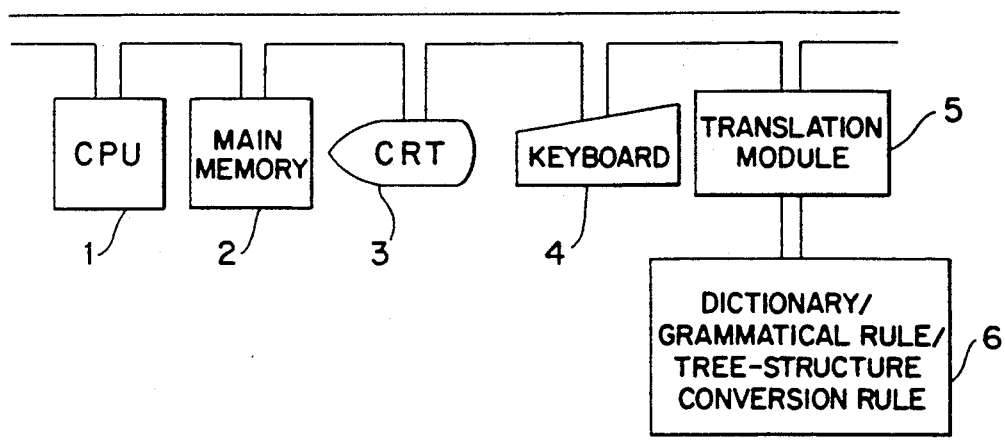
FIG. 1 is a block diagram of the translation machine system according to a preferred embodiment of the present invention.

Referring now to the drawings, the structure of the present invention is described hereinafter.

FIG. 1 is a block diagram of the translation machine system according to a preferred embodiment of the present invention.

In the diagram, numeral 1 is a central processing unit, 2 is a main memory, 3 is CRT display, 4 is a keyboard and 5 is a translation module. The translation module 5 is connected with a table containing a dictionary for translation, grammatical rules and tree-structure conversion rules.

Figure 2:
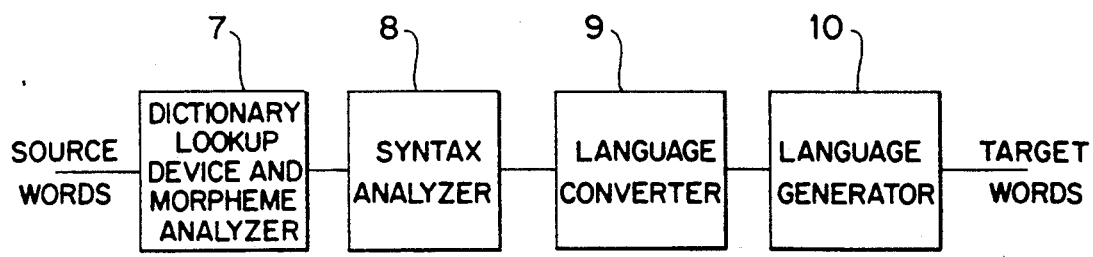
FIG. 2 is a block diagram of the translation module for the translation machine system.

The structure of the translation module 5 is shown in FIG. 2.

As shown in FIG. 2, the translation module 5 comprises a dictionary look up device and morpheme analyzer 7, a syntax analyzer 8, a language converter 9, and a language generator 10.

The dictionary look up device and morpheme analyzer 7 accesses the dictionary 6 during a translation function to obtain grammatical information on words such as parts of speech and meanings and analyzes the tense, person and number of each word analyzed.

The syntax analyzer 8 determines the structure of the sentence to be translated such as the relationship between words.

After the particular syntax of the source language is determined by the syntax analyzer 8, the language converter 9 converts the obtained syntax information of the source language into the appropriate corresponding syntax of a target language.

Then, the language generator 10 generates a target language such as the translation result from English to Japanese or Japanese to English.

Figure 3:
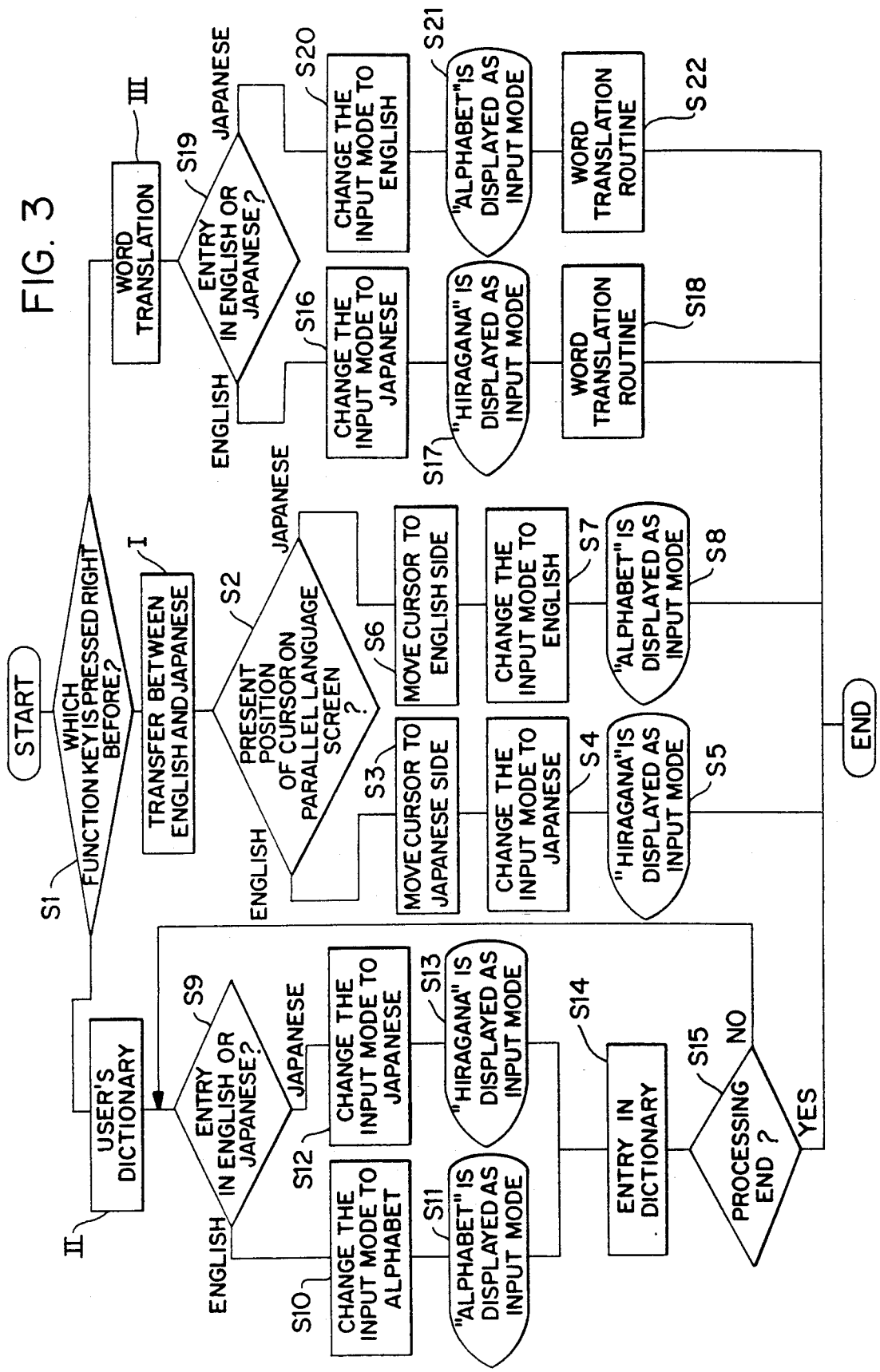
FIG. 3 is a flowchart showing the content of a processing unit for the translation machine system.

The general translating processing of the preferred embodiment is now explained by referring to the flowchart in FIG. 3.

There are three types of processing functions for the preferred embodiment as follows:

(I) Transferring function for transferring between Japanese and English input capabilities thereby automatically changing the cursor position;

(II) User's dictionary function; and (III) Word translation function;

The above-identified functions are structured so as to respond to the actuation of a specific key (function key) installed on the keyboard 4.

Sequentially, by determining which key is actuated in step S1, the system jumps to any one of the routines to execute function (I), function (II) or function (III).

The operation of each particular function will be more fully described by the following:

(I) Transferring function for transferring between Japanese and English input capabilities.

In this embodiment, as shown in FIG. 4, the input sentence and output sentence are displayed by using a parallel language screen.

The input sentence and output sentence are displayed in two divided windows so that two different sentences will not be mixed during a key input operation. Accordingly, the cursor will operate within a single one of the divided windows unless the cursor is transferred to a different window selecting the transferring function.

It is a J-E/E-J transfer key that executes the transferring function (I) to move the cursor from one window to another. Accordingly, when this function is selected, the input mode is also necessarily switched over to the other window along with the cursor.

If the function to transfer from English to Japanese is selected at step S1, step S2 is subsequently selected. At step S2, it is determined in which window of the parallel language screen the cursor exists when the transfer key is pressed.

According to the result of the determination made at step S2, the system selects its processing to follow step S3 or step S6. Thus, the former processing and the latter one are provided with mutually compatible contents but in two different languages.

In step S3, the cursor exists on the English side, and as a result of the operation conducted in step S3 the cursor is moved to the window on the Japanese side.

Sequentially at step S4, the input mode is changed to Japanese to enable the operator to input Japanese characters as opposed to English characters.

Then at step S5, the display for the input mode is changed to "Hiragana".

On the other hand, at step S6, since the cursor was originally on the Japanese side, the cursor is moved to the window on the English side.

Next at step S7, the input mode is changed to English to enable the operator to input English characters as opposed to Japanese characters.

Finally, at step S8, alphabet is displayed as the input mode.

In this way, the input mode is automatically set depending on the location of the cursor in response to selection of either a Japanese or English translation mode with a transfer function.

(II) User's dictionary function.

When this function is selected, the operation mode proceeds to the dictionary 6 to execute the entry of an input word in the user's dictionary 6.

More specifically, input into the dictionary 6 includes input of the word to be translated, and its meaning or its part of speech.

At this time, the input mode to be required from now is changed by the content of the input.

While responding to the determination that the User's dictionary key is operated at step S1, the system advances to step S9. At step S9, it is determined whether the entry to be executed is in Japanese or in English.

When it is determined at step S9 that the entry is to be conducted in English, the system proceeds to step S10 where the input mode is changed to an alphabet corresponding to the English language, and the word "Alphabet" is displayed on the input mode display part at step S11.

On the contrary, when it is determined at step S9 that the entry is to be conducted in Japanese, the system proceeds to step S12, where the input mode is changed to Japanese, and the word "Hiragana" is displayed on the input mode display part at step S13.

Next, the system transfers to its dictionary entry processing (step S14) and whether the processing is completed or not is determined (at step S15) and if the processing has not been completed, the processing returns to step S9.

An example of the screen in this routine is shown in FIG. 6.

(III) Word translation function.

When this function is selected, meanings of the word of the input language are displayed, from which a suitable word selection can be made. At the time, if there is no suitable word in the displayed meanings, the user can input a suitable word by himself. For the purpose of this input, the input mode is also automatically changed.

While responding to the judgment that the Word translation function key is operated a step S1, the operation proceeds to step S16 in an English-Japanese translation and the operation proceeds to step S20 in a Japanese-English translation. At step S16, the input mode is changed to the Japanese mode.

At the next step S17, the display of the input mode is changed to "Hiragana" and sequentially, the word translation routine of step S18 is executed.

An example of the screen of this routine is shown in FIG. 5. At step S20, the input mode is changed to the English mode.

At the next step S21, the display of the input mode is changed to "Alphabet" and sequentially, the word translation routine of step S22 is executed.

As described above, the translation system of this preferred embodiment is characterized by automatically corresponding the input mode to the desired input language by paying attention to the fact that, if the input language to be translated is different from that of the output language desired (for example, alphabet in English while Kana or Kanji in Japanese), the language to be input will be previously known from the input, editing or related processes in the two different languages.

As explained above, according to this invention, in a translation machine system for translating an input sentence, having means to determine the language to be entered depending on the processing status of the input, and setting means to set the input mode to correspond to the input language, the operation sequence can be shortened by eliminating the need for setting the input mode, so that the translator apparatus will be more convenient and easy to use.

While only certain embodiments of the present invention have been described, it will be apparent to those skilled in the art that various changes and modifications may be made therein without departing from the spirit and scope of the present invention as claimed.

We claim:

1. A translation machine system comprising:
   a key board for inputting data into said system in first and second languages;
   a plurality of function keys for selecting one of a corresponding plurality of processing modes of said system;
   means, responsive to actuation of any one of said plurality of function keys, for automatically and selectively setting data input by said keyboard to operate in one of said first and second languages according to a selected one of said plurality of processing modes; and
   means for automatically changing input in one of said first and second languages only if a processing step of a selected one of said plurality of processing modes is processing in an alternate language from a processing step of the prior processing mode.

2. The system according to claim 1, wherein one of said plurality of processing modes is a dictionary mode for executing display and entry of an input word into a user's dictionary in one of the first and second languages, said dictionary mode including means for inputting a meaning and part of speech of a word into the dictionary whereby processing automatically occurs in a language corresponding to an input one of said first and second languages.

3. The system according to claim 1, wherein one of said plurality of processing modes is a word translation mode for selecting words in one of the first and second languages from a dictionary, analyzing syntax of the selected words, translating the selected words into a remaining one of the first and second languages, displaying the translated words, and automatically setting said keyboard to a language corresponding to the translated words.

4. A translation machine system comprising:
a plurality of processing modes each for performing a predetermined sequence of operations;
means for selecting one of said plurality of processing modes;
means for inputting data into said translation machine system in response to said means for selecting; and
means for automatically and selectively setting an input mode of said translation machine system to correspond to a predetermined one of a first and second language according to a processing status of a selected one of said plurality of processing modes, thereby enabling an input into said translation machine system in the predetermined language by said means for inputting data.

5. The translation machine system according to claim 4, further including a display for viewing input data and processing operations, wherein said means for inputting includes a cursor for indicating a location for inputting said data on the display of said translation machine system.

6. The translation machine system according to claim 4, wherein one of said plurality of processing modes is a dictionary operation for executing display and entry of an input word into a user's dictionary in an input source language, said dictionary operation including means for inputting a meaning and part of speech of a word into the dictionary whereby processing automatically occurs in a language corresponding to an input one of said first and second languages.

7. The translation machine system according to claim 4, wherein one of said plurality of processing operations is a word translation operation for performing a word translation routine from an input source word in one of the first and second languages to a translated word in a remaining one of said first and second languages, whereby said means for inputting is automatically set to a language corresponding to the input word.

* * * * *